US009195324B2

(12) United States Patent
Su

(10) Patent No.: US 9,195,324 B2
(45) Date of Patent: Nov. 24, 2015

(54) INTERACTIVE WHITEBOARD SYSTEM AND WHITEBOARD WRITING INSTRUMENT THEREOF

(75) Inventor: Tzu-Wei Su, Taoyuan Hsien (TW)

(73) Assignee: DELTA ELECTRONICS, INC. (TW)

( * ) Notice: Subject to any disclaimer, the term of this patent is extended or adjusted under 35 U.S.C. 154(b) by 174 days.

(21) Appl. No.: 13/467,320

(22) Filed: May 9, 2012

(65) Prior Publication Data
US 2013/0234952 A1 Sep. 12, 2013

(30) Foreign Application Priority Data

Mar. 12, 2012 (TW) .............................. 101108208 A

(51) Int. Cl.
G06F 3/033 (2013.01)
G06F 3/0354 (2013.01)
G06F 3/042 (2006.01)

(52) U.S. Cl.
CPC .......... G06F 3/03545 (2013.01); G06F 3/0425 (2013.01)

(58) Field of Classification Search
CPC ..................................................... G06F 3/033
USPC ............... 345/156–179; 178/18.01, 18–18.03
See application file for complete search history.

(56) References Cited

U.S. PATENT DOCUMENTS

| 4,814,552 | A * | 3/1989 | Stefik et al. | 178/19.02 |
| 5,818,424 | A * | 10/1998 | Korth | 345/158 |
| 8,544,131 | B2 * | 10/2013 | Braun et al. | 15/22.1 |
| 8,619,042 | B2 | 12/2013 | Taniuchi | |
| 8,872,805 | B2 | 10/2014 | Matsumoto | |
| 2003/0071858 | A1 * | 4/2003 | Morohoshi | 345/856 |
| 2003/0076310 | A1 | 4/2003 | Kanzaki et al. | |
| 2003/0122780 | A1 * | 7/2003 | Hendriks et al. | 345/156 |
| 2004/0069934 | A1 | 4/2004 | Hendriks et al. | |
| 2009/0135149 | A1 * | 5/2009 | Taniuchi | 345/173 |
| 2010/0084203 | A1 | 4/2010 | Peng | |
| 2010/0156831 | A1 | 6/2010 | Doubrava et al. | |
| 2011/0084846 | A1 | 4/2011 | Li et al. | |
| 2011/0130096 | A1 * | 6/2011 | Dunkars | 455/41.2 |
| 2011/0234549 | A1 * | 9/2011 | Matsumoto | 345/179 |

FOREIGN PATENT DOCUMENTS

| CN | 101441535 | 5/2009 |
| CN | 201387595 | 1/2010 |
| CN | 101833386 | 9/2010 |
| CN | 101882012 | 11/2010 |
| CN | 102200884 | 9/2011 |
| TW | 200414059 | 8/2004 |
| TW | 200813788 | 3/2008 |
| TW | M350750 | 2/2009 |
| TW | 200945120 | 11/2009 |

* cited by examiner

Primary Examiner — Grant Sitta
(74) Attorney, Agent, or Firm — Hauptman Ham, LLP

(57) ABSTRACT

An interactive whiteboard system and a whiteboard writing instrument thereof are provided. The interactive whiteboard system comprises a whiteboard, a whiteboard writing instrument, a detection device and a projection device. The whiteboard writing instrument comprises a housing and an internal element that has a writing terminal. The writing terminal receives a pressure from the whiteboard when a user holds the whiteboard writing instrument to write contents on the whiteboard. The housing presents a pattern, which experiences a variation according to the pressure so that the detection device detects the variation of the pattern to get information corresponding to the contents. The projection device projects an image corresponding to the contents onto the whiteboard according to the information.

11 Claims, 5 Drawing Sheets

INTERACTIVE WHITEBOARD SYSTEM AND WHITEBOARD WRITING INSTRUMENT THEREOF

This application claims priority to Taiwan Patent Application No. 101108208 filed on Mar. 12, 2012, which is hereby incorporated by reference in its entirety.

CROSS-REFERENCES TO RELATED APPLICATIONS

Not applicable.

BACKGROUND OF THE INVENTION

1. Field of the Invention

The present invention provides an interactive whiteboard system and a whiteboard writing instrument thereof. More particularly, the present invention provides an interactive whiteboard system and a whiteboard writing instrument thereof that can determine the contents written on a whiteboard according to the variation of a pattern on the outer surface of the whiteboard writing instrument.

2. Descriptions of the Related Art

Whiteboards and whiteboard pens not only help with the interaction between speakers and audiences at various meetings and conferences, but also facilitate the understanding of contents expressed by the speaker. However, conventional whiteboard pens must be replaced frequently and contents written on the whiteboard are difficult to clear off, which make conventional whiteboards and whiteboard pens inconvenient use.

Due to the advancement of science and technologies related to information and communications, the applications of computers, communication products and consumer electronic products (generally termed as "3C" products) have gradually expanded to satisfy the various demands of the modern people. Therefore, in response to the trend towards electronic products, the applications of 3C products have also extended into the conventional field of whiteboards and whiteboard pens.

To present the writing contents from conventional electronic whiteboards and whiteboard pens, the electronic whiteboard pen must transmit the writing contents to a back-end processing system via a transmission module (e.g., an infrared (IR) module, a Bluetooth module or a wireless communication module) so that the back-end processing system can present the writing contents on the electronic whiteboard. Because conventional electronic whiteboard pens must be provided with a battery or with a power recharging function to operate continuously, issues of inconvenience, environment protection and costs have arisen.

On the other hand, because the contents written by conventional electronic whiteboard pens are in print form, it is difficult to detect the force with which a user uses to write. For example, male users usually write at a greater force than female users, and writings of children are usually not neat as those of adults. Therefore, the personal writing styles of different users cannot be accurately represented.

Accordingly, it is important to effectively overcome the problems with conventional electronic whiteboard pens in which electric power is needed to continuously operate the whiteboard and differences in the writing styles of different users are difficult to represent.

SUMMARY OF THE INVENTION

An objective of the present invention is to provide an interactive whiteboard system and a whiteboard writing instrument thereof. In detail, when the whiteboard writing instrument of the present invention is used to write contents on a whiteboard, a pattern that is presented on an outer surface of the whiteboard writing instrument will experience a variation according to a pressure received from the whiteboard. That is, the interactive whiteboard system of the present invention will gather information (e.g., including the thickness of the strokes, writing and so on) corresponding to the contents according to the variation of the pattern presented on a housing of the whiteboard writing instrument, and will project an image corresponding to the contents to the whiteboard according to the information.

Because it is unnecessary for the whiteboard writing instrument of the present invention to actively transmit the writing contents, the whiteboard writing instrument can operate continuously without the need of a power storage function. On the other hand, the whiteboard writing instrument of the present invention receives different pressures from the whiteboard in response to different levels of writing forces and the pattern presents different variations according to the different pressure strengths, so the differences in the writing styles of different users can be determined and presented by the interactive whiteboard system of the present invention.

To achieve the aforesaid objective, the present invention provides a whiteboard writing instrument with a changeable pattern representing information of writing. The whiteboard writing instrument comprises a housing and an internal element. The housing has a pattern display section for presenting the changeable pattern. A part of the internal element is disposed in the housing. The internal element comprises a writing terminal exposed outside the housing. The writing terminal receives a pressure from a whiteboard when a user holds the whiteboard writing instrument to write contents on the whiteboard. The changeable pattern presented by the housing experiences a variation according to the pressure so that a detection device detects the variation of the changeable pattern to get information corresponding to the contents, and a projection device projects an image corresponding to the contents onto the whiteboard according to the information.

To achieve the aforesaid objective, the present invention further provides an interactive whiteboard system. The interactive whiteboard system comprises a whiteboard, a whiteboard writing instrument with a changeable pattern representing information of writing, a detection device and a projection device. The whiteboard writing instrument includes a housing and an internal element. The housing has a pattern display section for presenting the changeable pattern. A part of the internal element is disposed in the housing. The internal element comprises a writing terminal exposed outside the housing. The writing terminal receives a pressure from a whiteboard when a user holds the whiteboard writing instrument to write contents on the whiteboard. The changeable pattern presented by the housing experiences a variation according to the pressure. The detection device is configured to detect the variation of the changeable pattern to get information corresponding to the contents. The projection device is coupled with the detection device and configured to project an image corresponding to the contents onto the whiteboard according to the information.

The detailed technology and preferred embodiments implemented for the present invention are described in the following paragraphs accompanying the appended drawings for people skilled in this field to well appreciate the features of the present invention.

DESCRIPTION OF THE PREFERRED EMBODIMENT

In the following descriptions, the present invention will be explained with reference to embodiments thereof. It shall be appreciated that these embodiments are not intended to limit the present invention to any specific environments, applications or particular implementations described in these embodiments and the attached drawings. Therefore, the description of these embodiments and the attached drawings is only for the purpose of illustration rather than to limit the present invention, and the scope claimed in this application shall be governed by the claims. Additionally, in the following embodiments and the attached drawings, elements not directly related to the present invention are omitted from depiction; and the dimensional relationships among the individual elements in the attached drawings are illustrated only for ease of understanding but not to limit the actual scale.

Figure 1:
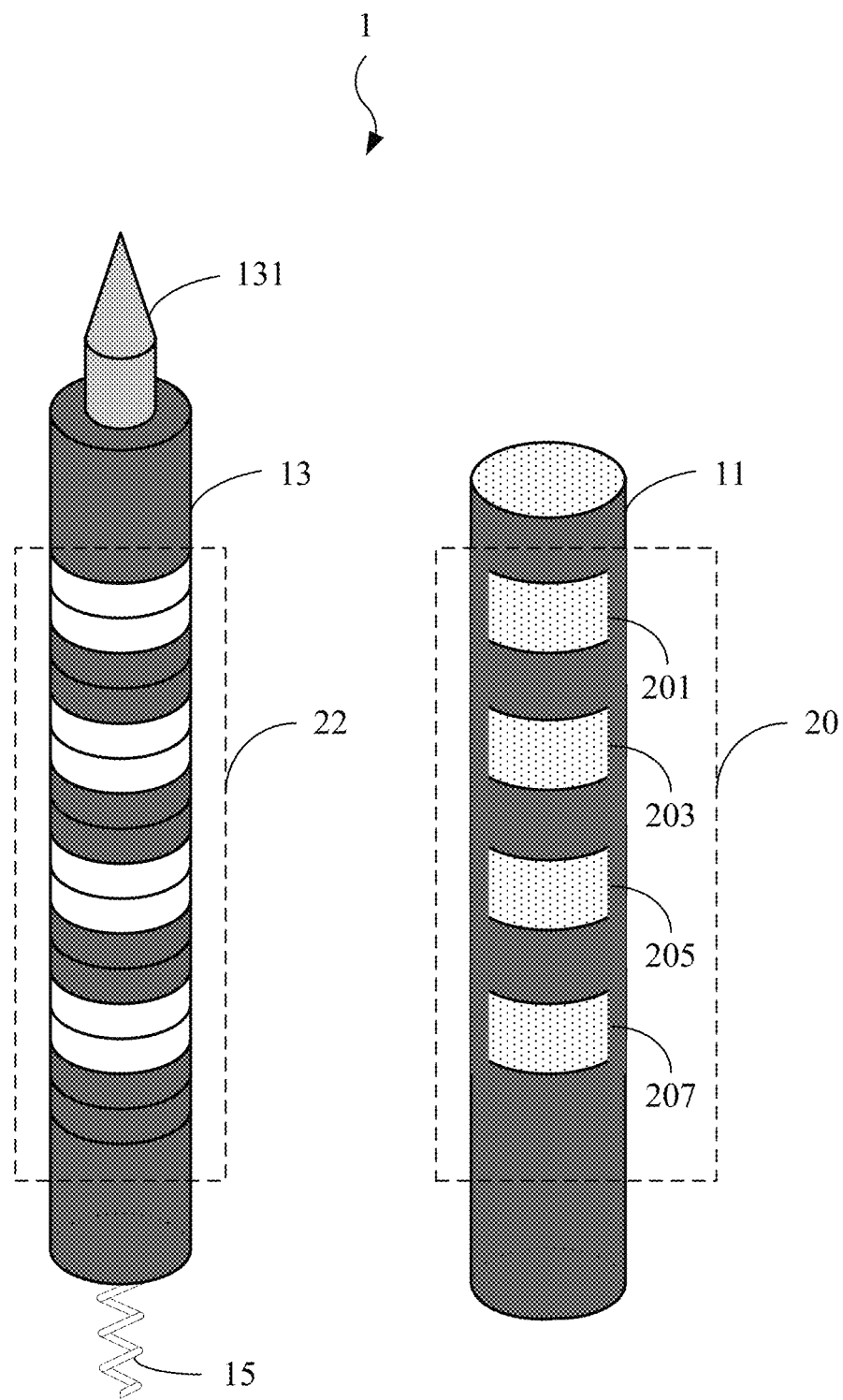
FIG. 1 is a schematic exploded view of a whiteboard writing instrument 1 according to the first embodiment of the present invention.
Figure 2A:
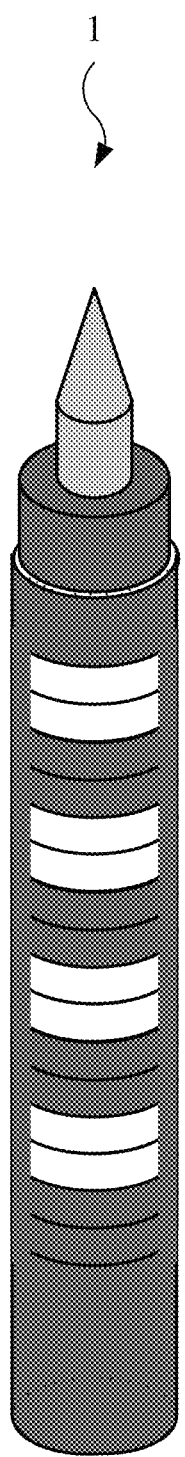
FIG. 2A is a schematic view illustrating the whiteboard writing instrument 1 when receiving no pressure according to the first embodiment of the present invention.
Figure 2B:
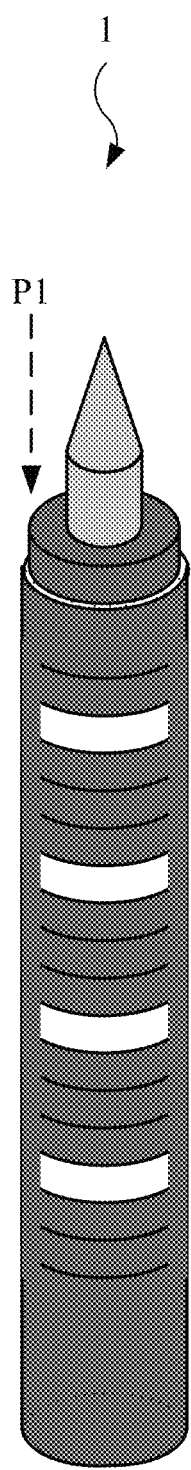
FIG. 2B is a schematic view illustrating the whiteboard writing instrument 1 when receiving pressure P1 according to the first embodiment of the present invention.
Figure 2C:
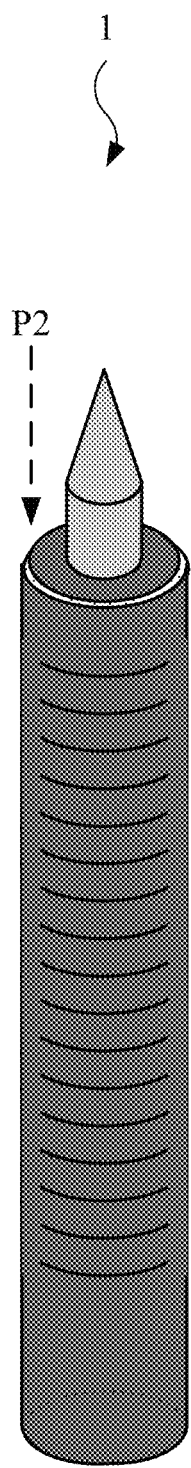
FIG. 2C is a schematic view illustrating the whiteboard writing instrument 1 when receiving pressure P2 according to the first embodiment of the present invention.

In references to FIGS. 1, 2A, 2B and 2C, the first embodiment of the present invention is a whiteboard writing instrument 1. FIG. 1 is a schematic exploded view of the whiteboard writing instrument 1 according to this embodiment; FIG. 2A is a schematic view illustrating the whiteboard writing instrument 1 when receiving no pressure according to this embodiment; FIG. 2B is a schematic view illustrating the whiteboard writing instrument 1 when receiving a pressure P1 according to this embodiment; and FIG. 2C is a schematic view illustrating the whiteboard writing instrument 1 when receiving a pressure P2 according to this embodiment.

As shown in FIG. 1, the whiteboard writing instrument 1 is in pen form, and comprises a housing 11, an internal element 13 and an elastic element 15. In this embodiment, the housing 11 is of a hollow tubular form, and may have a pattern display section 20 for presenting a changeable pattern on an outer surface thereof. The pattern display section 20 comprises a first square hole 201, a second square hole 203, a third square hole 205 and a fourth square hole 207. The aforesaid square holes can be formed in the outer surface of the housing 11 through cutting, hollowing or the like. It shall be appreciated that the square holes may be replaced with holes that have other shapes in other embodiments, such as circular, diamond, elliptical or trapezoidal in shape. The number of square holes may be increased or reduced depending on actual applications. Furthermore, the whiteboard writing instrument 1 in the pen form is a preferred implementation of this embodiment; however, other undisclosed forms such as spherical forms or cylindrical forms may still be devised as implementations of the present invention by those of ordinary skill in the art, and still fall within the scope claimed in the subject application.

The internal element 13 comprises a writing terminal 131. The other terminal of the internal element 13 that is opposite to the writing terminal 131 connects to the elastic element 15. In this embodiment, an outer surface of the internal element 13 has a fixed pattern 22, which comprises sixteen circular sub-patterns with two different colors such as a light color and a dark color. The circular sub-patterns may be formed on the outer surface of the internal element 13 through the coating of a pigment or printing, but are not merely limited thereto. The sixteen circular sub-patterns, from the nearest one from the writing terminal 131 to the farthest one from the writing terminal 131 (hereinafter referred to as "from top to bottom"), are represented as the light color, the light color, the dark color, the dark color, the light color, the light color, the dark color, the dark color, the light color, the light color, the dark color, the dark color, the light color, the light color, the dark color, and the dark color respectively.

As shown in FIG. 2A, a part of the internal element 13 is disposed in the housing 11, and the writing terminal 131 of the internal element 13 is exposed outside the housing 11. The elastic element 15 is disposed in the housing 11 to connect the internal element 13 and the bottom of the housing 11. Because of the support of the elastic element 15, the writing terminal 131 of the internal element 13 receives a pressure from a whiteboard when a user holds the whiteboard writing instrument 1 to write contents on the whiteboard. It shall be appreciated that the elastic element 15 may be a spring, a tension spring, a torsion spring, an elastic piece, or any other element with elasticity.

When no pressure is received by the writing terminal 131 from the whiteboard, the elastic element 15 is not pressed. In this case, the first and the second circular sub-patterns, the fifth and the sixth circular sub-patterns, the ninth and the tenth circular sub-patterns, and the thirteenth and the fourteenth circular sub-patterns of the fixed pattern 22 on the outer surface of the internal element 13 completely correspond to the spaces exposed by the first square hole 201, the second square hole 203, the third square hole 205 and the fourth square hole 207 of the housing 11 respectively. Thus, the colors presented on the pattern display section 20 are the light color, the light color, the dark color, the dark color, the light color, the light color, the dark color, the dark color, the light color, the light color, the dark color, the dark color, the light color, the light color, the dark color, and the dark color respectively from top to bottom.

When a detection device detects that a changeable pattern presented on the pattern display section 20 is of the aforesaid colors, the changeable pattern is represented as 0011001100110011 in the binary form and/or 0x3333 in the hexadecimal form, by assigning the colors a light value and a dark value (i.e., defining the light color as 0 and the dark color as 1). In other words, when the detection device detects that the changeable pattern presented on the pattern display section 20 corresponds to 0011001100110011 or 0x3333, the detection device determines that the whiteboard writing instrument 1 is not being used (i.e., the writing terminal 131 of the whiteboard writing instrument 1 receives no pressure from the whiteboard). In this case, a projection device will not project any image onto the whiteboard either.

Variations of the changeable pattern presented on the pattern display section 20 of the housing 11 of the whiteboard writing instrument 1 will be further described with reference to FIGS. 2B and 2C.

As shown in FIG. 2B, when a user holds the whiteboard writing instrument 1 to write contents on the whiteboard and the whiteboard writing instrument 1 receives a pressure P1 from the whiteboard, the writing terminal 131 will be pressed by the pressure P1 to drive the internal element 13 to move down towards the elastic element 15. In this case, the internal element 13 is displaced according to a strength of the pressure P1, and the fixed pattern 22 of the internal element 13 leads to the change of the changeable pattern presented on the pattern display section 20 so that the changeable pattern presented on the pattern display section 20 experiences a variation. Thus, the colors presented on the pattern display section 20 of the whiteboard writing instrument 1 that is pressed by the pressure P1 will be changed into the dark color, the light color, the dark color, the dark color, the dark color, the light color, the dark color, the dark color, the dark color, the light color, the dark color, the dark color, the dark color, the light color, the dark color, and the dark color from top to bottom.

Similarly, when a detection device detects that the changeable pattern presented on the pattern display section 20 is of the aforesaid colors, the changeable pattern is represented as 1011101110111011 in the binary form and/or 0xBBBB in the hexadecimal form by assigning the colors a light value and a dark value (i.e., defining the light color as 0 and the dark color as 1). In other words, when the detection device detects that the changeable pattern presented on the pattern display section 20 corresponds to a value of 1011101110111011 or 0xBBBB, the detection device determines that the user is now holding the whiteboard writing instrument 1 to write and the writing terminal 131 of the whiteboard writing instrument 1 is receiving the pressure P1 from the whiteboard, and further gets information (comprising the aforesaid value) corresponding to the contents written by the whiteboard writing instrument 1 on the whiteboard. In this case, a projection device will project an image onto the whiteboard corresponding to the contents written by the whiteboard writing instrument 1 on the whiteboard according to the information detected by the detection device.

As shown in FIG. 2C, when the level of the writing force applied by the whiteboard writing instrument 1 is increased, a pressure P2 received from the whiteboard will be greater than the pressure P1. Thus, the writing terminal 131 will be pressed to the greatest extent by the pressure P2 so that the internal element 13 moves down towards the elastic element 15 to the greatest extent. In this case, the internal element 13 is displaced according to a strength of the pressure P2, and the fixed pattern 22 of the internal element 13 leads to the change of the changeable pattern presented on the pattern display section 20 so that the changeable pattern presented on the pattern display section 20 experiences a variation. Thus, the colors presented on the pattern display section 20 of the whiteboard writing instrument 1 that is pressed by the pressure P2 will be changed into the dark color, the dark color, the dark color, the dark color, the dark color, the dark color, the dark color, the dark color, the dark color, the dark color, the dark color, the dark color, the dark color, the dark color, the dark color, and the dark color from top to bottom.

Similarly, when a detection device detects that the changeable pattern presented on the pattern display section 20 is of the aforesaid colors, the changeable pattern is represented as 1111111111111111 in the binary form and/or 0xFFFF in the hexadecimal form by assigning the colors a light value and a dark value (i.e., defining the light color as 0 and the dark color as 1). In other words, when the detection device detects that the changeable pattern presented on the pattern display section 20 corresponds to a value of 1111111111111111 or 0xFFFF, the detection device determines that the user is now holding the whiteboard writing instrument 1 to write and the writing terminal 131 of the whiteboard writing instrument 1 is receiving the pressure P2 (i.e., the maximum pressure) from the whiteboard, and further gets information (comprising the aforesaid value) corresponding to the contents written by the whiteboard writing instrument 1 on the whiteboard. In this case, a projection device will project onto the whiteboard an image corresponding to the contents written by the whiteboard writing instrument 1 on the whiteboard according to the information detected by the detection device.

According to the related descriptions of FIGS. 2A to 2C, the method in which the whiteboard writing instrument 1 changes the changeable pattern presented on the pattern display section 20 according to the different pressures received by the writing terminal 131 to differentiate differences in the contents written on the whiteboard by different levels of writing forces will be clearly understood by those of ordinary skill in the art. It shall be appreciated that those of ordinary skill in the art can also readily devise the correspondence relationships between the pressure strengths and the changeable pattern presented on the pattern display section 20 of the whiteboard writing instrument 1 according to the related descriptions of FIGS. 2A to 2C; e.g., the changeable pattern presented on the pattern display section 20 may be divided into more levels to reflect finer pressure variations.

Figure 3:
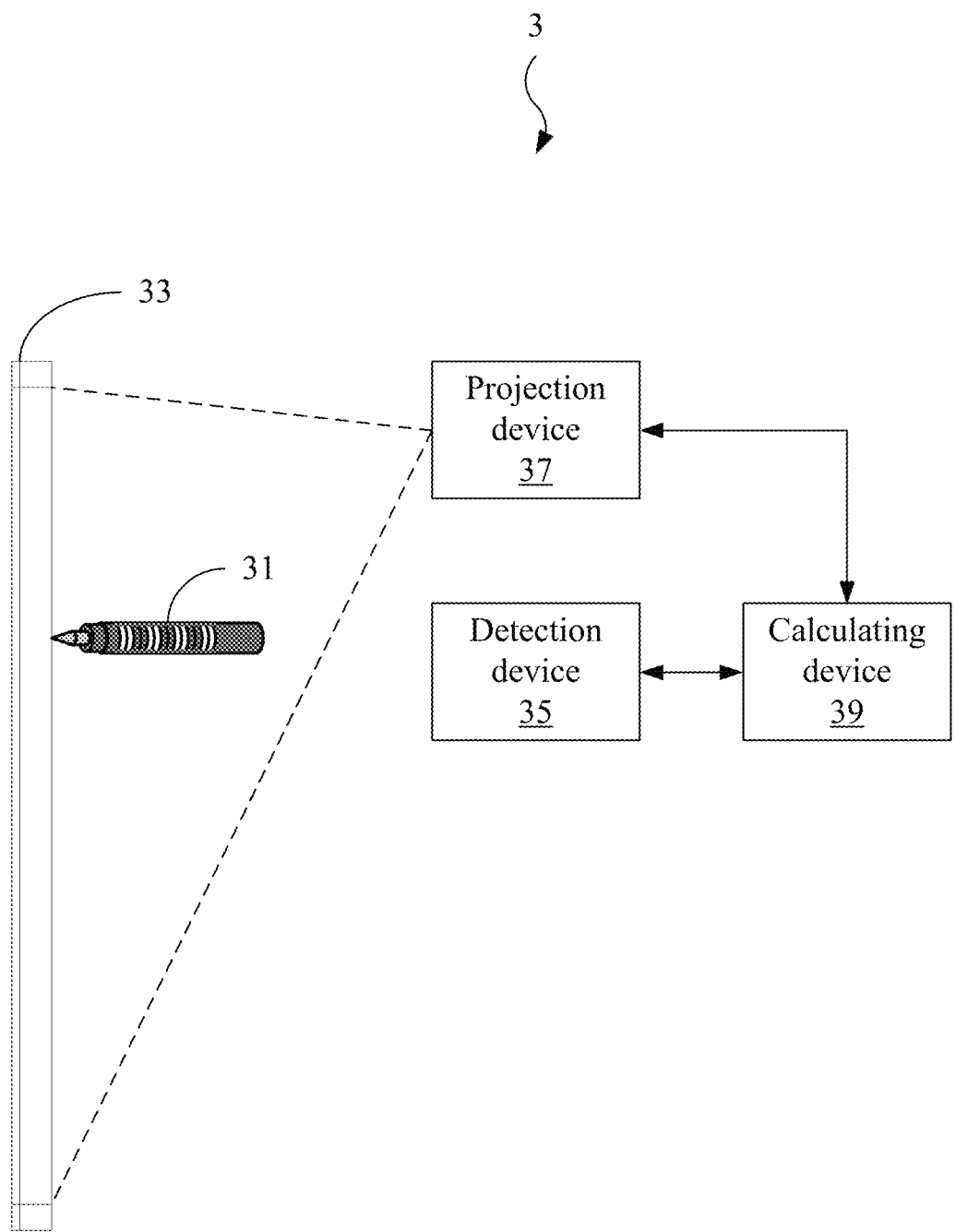
FIG. 3 is a schematic view of an interactive whiteboard system 3 according to the second embodiment of the present invention.

FIG. 3 illustrates the second embodiment of the present invention, which is an interactive whiteboard system 3. FIG. 3 is a schematic view of the interactive whiteboard system 3 according to this embodiment. As shown in FIG. 3, the interactive whiteboard system 3 comprises a whiteboard writing instrument 31, a whiteboard 33, a detection device 35, a projection device 37 and a calculating device 39. It shall be appreciated that the whiteboard writing instrument 31 of this embodiment may be viewed as the whiteboard writing instrument 1 of the first embodiment, and thus, may have the same operations and functions as the whiteboard writing instrument 1 of the first embodiment.

In this embodiment, the detection device 35 and the projection device 37 are each coupled with the calculating device 39 via a wired or wireless connection. Furthermore, the detection device 35 is disposed within a viewable range of the whiteboard writing instrument 31 (i.e., disposed within a range where a variation of a pattern presented on a housing of the whiteboard writing instrument 31 can be detected). In this embodiment, the detection device 35 may be a monitoring or photographic apparatus.

When the whiteboard writing instrument 31 writes contents on the whiteboard 33, the whiteboard writing instrument 31 receives a pressure from the whiteboard 33. In this case, the detection device 35 can detect a variation of the pattern presented on the housing of the whiteboard writing instrument 31, and calculates the pressure through the use of the calculating device 39 to get information corresponding to the contents. Then, the projection device 37 gets information through the calculating device 39 and further project an image corresponding to the contents onto the whiteboard 33 according to the information.

The aforesaid coupling manner is a preferred example of this embodiment. However, the calculating device 39 may also be disposed within the detection device 35, and the detection device 35 may be coupled to the projection device 37 via a wired or wireless connection. In this case, the projection device 37 can directly get the information from the detection device 35, and further project an image corresponding to the contents onto the whiteboard 33 according to the information.

It shall be appreciated that the second embodiment can also execute all the operations and functions set forth in the first embodiment in addition to the aforesaid steps. The method in which the second embodiment executes these operations and functions will be readily appreciated by those of ordinary skill in the art based on the explanation of the first embodiment, and thus will not be further described herein.

According to the above descriptions, when the whiteboard writing instrument of the present invention is used to write contents on a whiteboard, the pattern presented on the outer surface of the whiteboard writing instrument will experience a variation according to the pressure received from the whiteboard. The interactive whiteboard system of the present invention gathers information (e.g., including the thickness of the strokes, writing and so on) corresponding to the contents according to the variation of the pattern presented on a housing of the whiteboard writing instrument, and projects an image corresponding to the contents to the whiteboard according to the information.

Because it is unnecessary for the whiteboard writing instrument of the present invention to actively transmit the writing contents, the whiteboard writing instrument can operate continuously without the need of a power storage function. On the other hand, the whiteboard writing instrument of the present invention receives different pressures from the whiteboard in response to different levels of writing forces and the pattern presents different variations according to the different pressure strengths, so the differences in the writing styles of different users can be determined and presented by the interactive whiteboard system of the present invention.

The above disclosure is related to the detailed technical contents and inventive features thereof. People skilled in this field may proceed with a variety of modifications and replacements based on the disclosures and suggestions of the invention as described without departing from the characteristics thereof. Although such modifications and replacements are not fully disclosed in the above descriptions, they have substantially been covered in the following claims as appended.

What is claimed is:

1. A nonelectric whiteboard writing instrument with a changeable pattern representing information of writing, comprising:
    a housing, having a pattern display section for presenting the changeable pattern; and
    an internal element, a part of the internal element being disposed in the housing, the internal element comprising a writing terminal exposed outside the housing, and the writing terminal receiving a pressure from a whiteboard when a user holds the nonelectric whiteboard writing instrument to write contents on the whiteboard;
    wherein the internal element experiences a movement according to the pressure, and the changeable pattern experiences a variation according to the movement of the internal element, so that a detection device detects the variation of the changeable pattern to get information corresponding to the contents, and a projection device projects an image corresponding to the contents onto the whiteboard according to the information; and
    wherein an outer surface of the internal element further has a fixed pattern thereon leading to the variation of the changeable pattern according to the movement of the internal element.

2. The nonelectric whiteboard writing instrument as claimed in claim 1, further comprising an elastic element, the elastic element being disposed in the housing to connect the internal element and the housing.

3. The nonelectric whiteboard writing instrument as claimed in claim 1, wherein the pattern display section of the housing further comprises multiple holes to present at least a portion of the fixed pattern of the internal element.

4. The nonelectric whiteboard writing instrument as claimed in claim 3, wherein the fixed pattern comprises multiple sub-patterns with at least two different colors.

5. An interactive whiteboard system, comprising:
    a whiteboard;
    a nonelectric whiteboard writing instrument with a changeable pattern representing information of writing, comprising:
        a housing, having a pattern display section for presenting the changeable pattern; and
        an internal element, a part of the internal element being disposed in the housing, the internal element comprising a writing terminal exposed outside the housing, and the writing terminal receiving a pressure from a whiteboard when a user holds the nonelectric whiteboard writing instrument to write contents on the whiteboard;
        wherein the internal element experiences a movement according to the pressure, and the changeable pattern presented by the housing experiences a variation according to the movement of the internal element; and
        wherein an outer surface of the internal element further has a fixed pattern thereon leading to the variation of the changeable pattern according to the movement of the internal element;
    a detection device, being configured to detect the variation of the changeable pattern to get information corresponding to the contents; and
    a projection device, being coupled with the detection device and configured to project an image corresponding to the contents onto the whiteboard according to the information.

6. The interactive whiteboard system as claimed in claim 5, wherein the nonelectric whiteboard writing instrument further includes an elastic element, the elastic element is disposed in the housing to connect the internal element and the housing.

7. The interactive whiteboard system as claimed in claim 5, wherein the pattern display section of the housing further comprises multiple holes to present at least a portion of the fixed pattern of the internal element.

8. The interactive whiteboard system as claimed in claim 7, wherein the fixed pattern comprises multiple sub-patterns with at least two different colors.

9. The interactive whiteboard system as claimed in claim 5, wherein the projection device is coupled with the detection device via a calculating device, and the calculating device is configured to calculate the pressure based on the variation of the changeable pattern presented by the housing to get the information.

10. The interactive whiteboard system as claimed in claim 9, wherein the detection device is coupled with the calculating device via one of a wireless connection and a wired connection.

11. The interactive whiteboard system as claimed in claim 9, wherein the projection device is coupled with the calculating device via one of a wireless connection and a wired connection.

* * * * *